United States Patent
Chow et al.

(10) Patent No.: US 6,326,984 B1
(45) Date of Patent: Dec. 4, 2001

(54) METHOD AND APPARATUS FOR STORING AND DISPLAYING VIDEO IMAGE DATA IN A VIDEO GRAPHICS SYSTEM

(75) Inventors: Paul Chow, Richmond Hill; Carl K. Mizuyabu, Thornhill; Philip L. Swan, Richmond Hill; Allen J.C. Porter, Thornhill; Chun Wang, Toronto, all of (CA)

(73) Assignee: ATI International SRL, Christ Church (BB)

( * ) Notice: Subject to any disclaimer, the term of this patent is extended or adjusted under 35 U.S.C. 154(b) by 0 days.

(21) Appl. No.: 09/186,034

(22) Filed: Nov. 3, 1998

(51) Int. Cl.$^7$ ........................................... G09G 5/00
(52) U.S. Cl. ............................................ 345/764; 345/506
(58) Field of Search ....................... 345/339, 335, 345/356, 357, 501, 502, 515, 506, 764, 744, 853, 854, 503

(56) References Cited

U.S. PATENT DOCUMENTS

| | | | |
|---|---|---|---|
| 5,854,620 | * 12/1998 | Mills et al. | 345/153 |
| 5,938,756 | * 8/1999 | Van Hook et al. | 712/23 |
| 5,949,428 | * 9/1999 | Toelle et al. | 345/431 |
| 5,973,696 | * 10/1999 | Agranat et al. | 345/357 |

* cited by examiner

*Primary Examiner*—Cao H. Nguyen
(74) *Attorney, Agent, or Firm*—Vedder, Price, Kaufman & Kammholz

(57) ABSTRACT

A method and apparatus for storing and displaying video image data in a video graphics system is accomplished by receiving a video data stream, where the video data stream includes compressed video image data. The video image stream is parsed to separate the compressed video image data from other data within the data stream. The compressed video image data is decompressed to produce video image data that includes a luminosity plane, a first color plane, and a second color plane. Members of the first and second color planes are compacted together to form color pairs where a plurality of the color pairs form a color line. Each of the color lines is interleaved with at least one luminosity line to produce an interleaved plane. The interleaved plane is stored in memory. Portions of the interleaved video image data are retrieved from the interleaved plane. The portions are structured such that video image data that are located near each other within the memory are fetched together. A video output is generated based on the retrieved groups of image data where the luminosity and color values within each of the fetched groups of image data are utilized together to produce the video output.

20 Claims, 6 Drawing Sheets

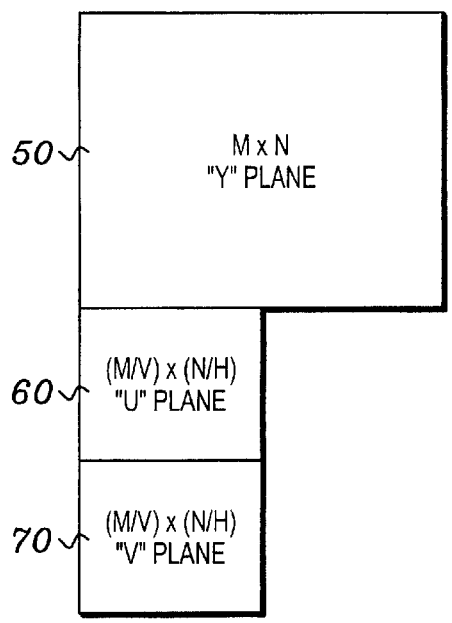
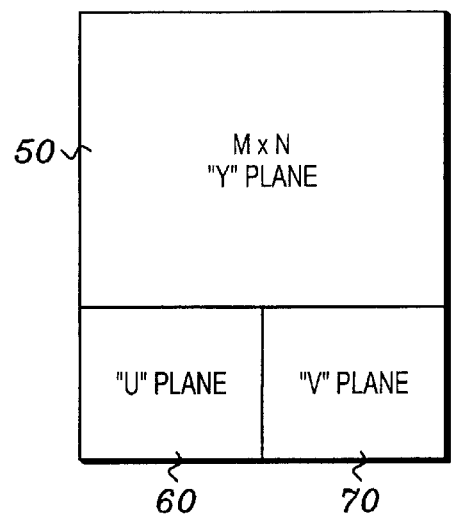
FIG.2  FIG.3

METHOD AND APPARATUS FOR STORING AND DISPLAYING VIDEO IMAGE DATA IN A VIDEO GRAPHICS SYSTEM

FIELD OF THE INVENTION

The invention relates generally to video graphics processing and more particularly to a method and apparatus for storing and displaying video image data in a video graphics system.

BACKGROUND OF THE INVENTION

Video information and graphical information are being combined in an increasing number of applications. Examples include video displays with animated graphical icons, on-screen menus, or a pop-up world-wide web browser. In these applications, the processing circuitry must accommodate both the video information and the graphical information. Because both of these portions of the system can consume large amounts of system bandwidth, speed limitations within the system can corrupt the video and/or graphical information when it is displayed.

For example, when a system displays video information that is stored in a memory structure and also displays graphical information stored in the memory structure, bandwidth limitations on the memory can cause bottlenecks which lead to corruption of the display. In typical mixed video and graphics systems, video information is the first priority, as corruption within the video data stream is more noticeable and difficult to correct. In order to allow the video information and the graphical information within the system to be processed effectively and quickly such that corruption does not result, efficient use of existing bandwidth is essential.

For example, in a system that includes MPEG video streams that require a great deal of fetching from the memory in order to generate successive images, the amount of bandwidth consumed by the processing activities can be substantial. Combining this processing intensive bandwidth with the storage of an incoming video data stream, incoming graphics images, and the fetching of these various images for display makes efficient use of the limited memory bandwidth critical. In systems that display video information in real time, overloading memory bandwidth can starve one or more blocks in the system, causing images to be lost or corrupted on the display.

In prior art systems, these bandwidth considerations were not as paramount as video information and graphical information were often sourced separately and combined in a different manner that was less intertwined. In such cases, bandwidth limitations of a memory would only effect one or the other of the two data sources. However, in current systems which attempt to more fully integrate the video and graphics information storage and processing, these bandwidth limitations are magnified as both sets of data must be handled by the same processing system.

Although one solution to such a problem might include expanding the bandwidth of the memory either by adding additional individual memory blocks or increasing the number of access ports or processors dealing with the memory, these solutions increase costs. These costs are incurred both in additional die area on the integrated circuit, and also in the additional complexity added to the system. As video graphics circuits continue to evolve, integration of the video processing and graphics processing portions of the system are important for both economic and functional reasons. For this reason, expanding the bandwidth of the memory through the addition of more memory or additional ports is undesirable.

Therefore a need exists for a method and apparatus for storing and displaying video image data in a video graphics system which reduces the amount of memory bandwidth required while allowing the image data to be fetched and displayed without corruption.

BRIEF DESCRIPTION OF THE DRAWINGS

FIG. 2 illustrates video data in a plainer format in accordance with the present invention;

FIG. 3 illustrates video data where a portion of the video data has been packed in accordance with the present invention;

DETAILED DESCRIPTION OF A PREFERRED EMBODIMENT OF THE INVENTION

Generally, the present invention provides a method and apparatus for storing and displaying video image data in a video graphics system. This is accomplished by receiving a video data stream, where the video data stream includes compressed video image data. The video image stream is parsed to separate the compressed video image data from other data within the data stream. The compressed video image data is decompressed to produce video image data that includes a luminosity plane, a first color plane, and a second color plane. Members of the first and second color planes are compacted together to form color pairs where a plurality of the color pairs form a color line. Each of the color lines is interleaved with at least one luminosity line to produce an interleaved plane. The interleaved plane is stored in memory. Portions of the interleaved video image data are retrieved from the interleaved plane. The portions are structured such that video image data that are located near each other within the memory are fetched together. A video output is generated based on the retrieved groups of image data where the luminosity and color values within each of the fetched groups of image data are utilized together to produce the video output.

Packing and interleaving the video image data within the memory allows fetches from the memory to be performed more efficiently and using less bandwidth. By understanding that the groups of image data will be fetched together from the memory and placing image data which will be used within those groups, efficiency of the memory usage is greatly enhanced, thus allowing video and graphics images to be stored and utilized effectively within a single system.

Figure 1:
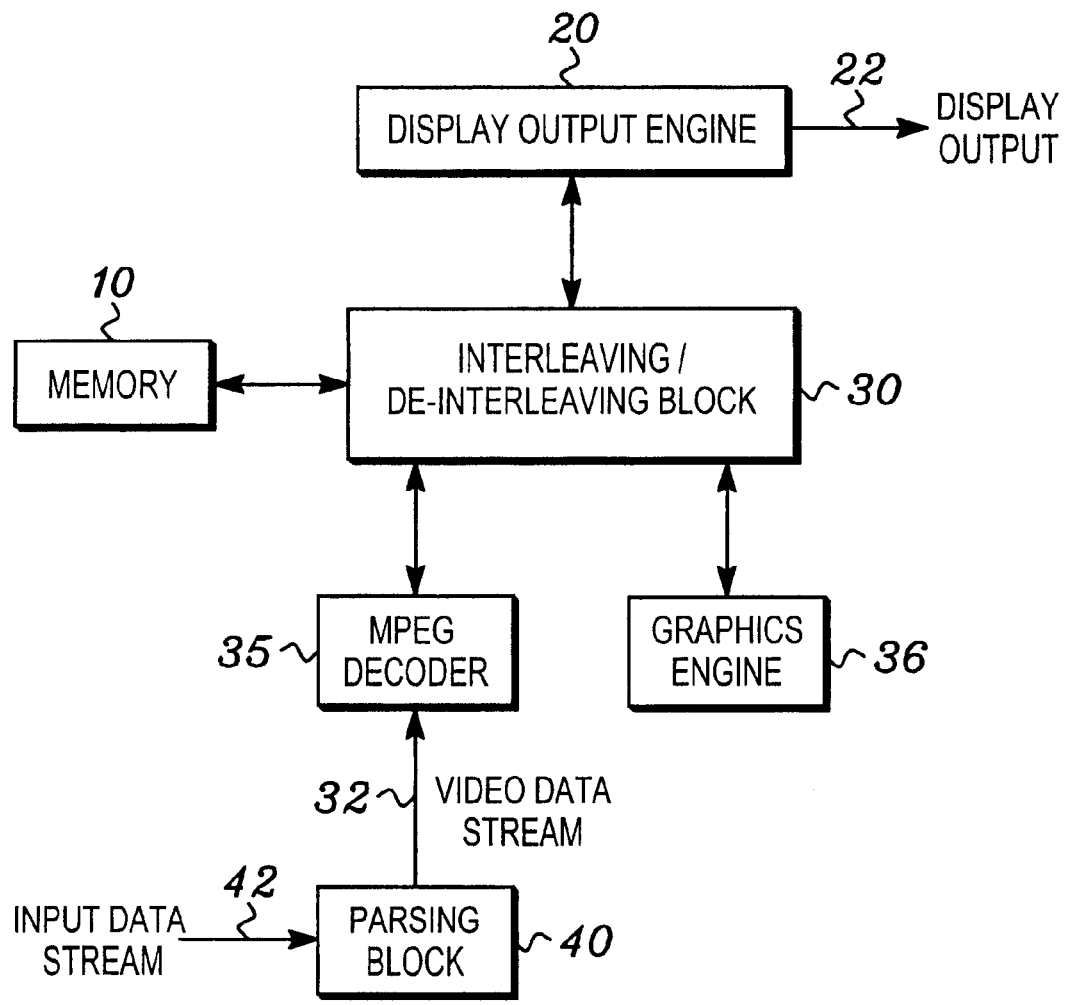
FIG. 1 illustrates a block diagram of a video graphics circuit in accordance with the present invention.

The invention can be better understood with reference to FIGS. 1–6. FIG. 1 illustrates a video graphics processing circuit that includes a memory 10, a display output engine 20, and an interleaving/de-interleaving block 30. If the circuit is utilized for MPEG video data stream display, an MPEG decoder 35 is present in the system. Similarly, a graphics engine 36 may be present in the circuit in order to generate graphics images stored in the memory 10.

The memory 10 may be a frame buffer in a video graphics integrated circuit. The memory 10 may be a single memory device or a plurality of memory devices. These memory devices may include random access memory, floppy disk memory, hard disk memory, system memory, reprogrammable memory, magnetic tape memory, and/or any device that stores digital information. In a video graphics system, video data is often received intermingled with other portions of display or control data. For this reason, the video graphics circuit of FIG. 1 may also include parsing block 40.

The parsing block 40 receives the input data stream 42, which includes video information and other stream components. The other stream components may include graphics information that will be displayed together with the video information. The parsing block 40 parses the input data stream 42 to separate the video data stream 32 from the other stream components. These other stream components may be fed to other blocks within the video graphics processing circuit for processing.

The video information present in the video data stream 32 includes image data that is made up of a number of different components. Preferably, the video image data includes a luminosity plane, which is often referred to as the "Y" plane. Also included within the image data are first and second color planes, often referred to as the "U" plane and the "V" plane. FIG. 2 illustrates a luminosity, or "Y" plane 50, as it is typically received in a video data stream 32. Also illustrated in FIG. 2 are the separate color planes, the "U" plane 60, and the "V" plane 70. FIG. 2 illustrates the typical planar format in which these three planes are received in the video data stream 32.

As can be seen, a "Y" plane 50 may be larger than the "U" and "V" planes 60 and 70. As illustrated, the "Y" plane 50 is an M x N array of samples, which are eventually used to generate the display data. The "Y" plane 50 may be larger than the "U" plane 60 and the "V" plane 70 because luminosity is often sampled to a greater resolution than either of the color components. The two color planes 60 and 70 are structured as M/V x N/H planar surfaces that are typically received one after the other. The height of these planar surfaces (M/V) is dependent on the vertical subsampling ratio (V) between the "U" or "V" plane and the "Y" plane. Similarly, the width of the surfaces (N/H) is dependent on a horizontal subsampling ratio (H). For example, if four "Y" components are combined with one "U" component and one "V" component, the vertical and horizontal subsampling ratios may each be two. Thus, each of the "U" and "V" planes would be one-quarter the size of the "Y" plane in area, with their horizontal and vertical dimensions being one-half that of the "Y" plane. It should be apparent to one skilled in the art that various aspect ratios between the planar surfaces can be realized based on subsampling ratios.

If when received the "Y" plane 50, "U" plane 60, and "V" plane 70 are merely stored in the memory as received, fetching from the memory would be very inefficient. This is because when utilized by the processing circuitry within the system, four components of the "Y" plane are typically utilized with one component from each of the "U" and the "V" planes. In typical memory structures, when an access to a single page within the memory is performed, it is an efficient access. However, when more than one page within the memory are accessed to retrieve data for processing, a penalty is incurred. This inherent limitation of memory can be very detrimental when numerous accesses to the memory require multiple pages to be accessed. As can be seen, if the "Y" plane and the "U" and "V" planes are located across page boundaries, accesses which retrieve a portion of each plane will be inefficient as numerous pages will be accessed. For this reason, the data within the "Y", "U", and "V" planes is intermingled within the present invention to allow these accesses to be more efficient.

Returning to FIG. 1, the MPEG decoder receives the video data stream 32 which includes video data which may be structured as is illustrated in FIG. 2. If the video data received by the MPEG decoder is an "I" frame or another type of video data that is not combined with other data in order to generate an image, the data may be passed directly to the interleaving/de-interleaving block 30. In other cases, the information in the video data stream 32 may require that image data be fetched from the memory 10 and combined with the received data in order to generate a new image. In either case, video data must be stored and/or fetched from the memory 10. In an MPEG system, these fetches would occur when a "P" or "B" frame was received in the video data stream 32.

During a store operation, the interleaving/de-interleaving block 30 rearranges the image data before it stores it in the memory 10. This rearranging of the data allows fetches from the memory 10 by the display output engine 20 to be much more efficient. When data is fetched from the memory 10, the interleaving/de-interleaving block 30 must de-interleave or un-rearrange the data such that it is in the format expected by the fetching component.

FIG. 3 illustrates one option that interleaving/de-interleaving block 30 has for rearranging the video image data. FIG. 3 illustrates the "Y" plane 50 stored directly into memory as it is received. However, FIG. 3 also illustrates the "U" and the "V" planes 60 and 70 in a planar packed format. The planar packed format moves the "V" plane 70 into memory cells adjacent to the "U" plane 60. In the example illustrated, this rearrangement produces a block of color component data that is of equal width as the "Y" plane 50. Assuming that the memory is structured such that the "U" and the "V" planes 60 and 70 can be stored side by side in such a manner, the likelihood that either the "U" or the "V" plane will be located on a separate memory page from the "Y" plane is reduced. This is because the vertical dimension of the overall storage of the video data has been reduced. In addition to this benefit, the fetches from the "U" and "V" planes 60 and 70 are most likely single page fetches, whereas in the planar format these two planes have a higher probability of being on separate pages.

Thus, if the data is rearranged and stored as illustrated in FIG. 3, the number of multiple page fetches that will occur when the display output engine 20 retrieves data from the memory 10 will be reduced. This method of rearranging the video graphics data may easily be combined with additional packing and interleaving techniques to further improve the efficiency of fetches from the memory 10.

Figure 4:
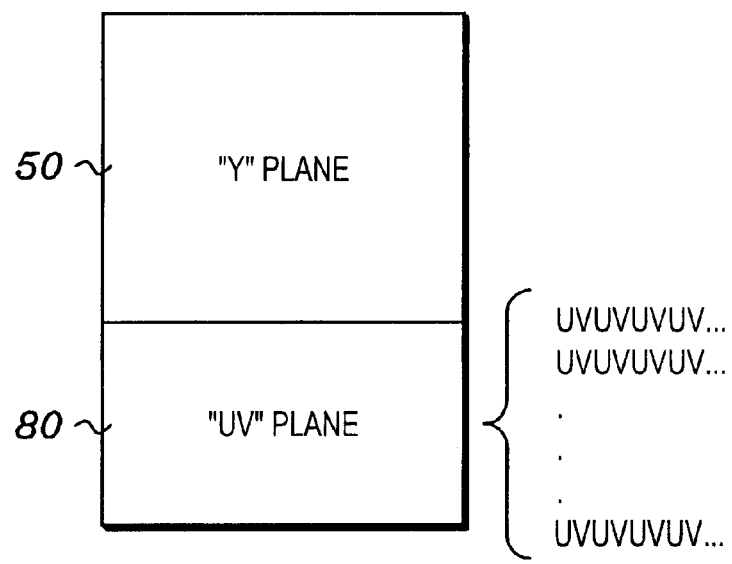
FIG. 4 illustrates video data where a packed portion of the video data has been interleaved in accordance with the present invention.

FIG. 4 illustrates another packing technique. In FIG. 4, the "Y" plane 50 remains in its received format. However, the "U" and "V" planes are packed into "UV" plane 80 that effectively intermingles the "U" and "V" components. "Packing" in this case is defined to include horizontal interleaving of data components. As is shown in FIG. 4, the interleaved "UV" plane 80 includes components of the "U" plane 60 and the "V" plane 70 in a packed format in which "U" components and "V" components alternate within the plane. Because "U" and "V" components are used together in combination with luminosity data in the "Y" plane 50 to create the video output or to generate a new image, interleaving the "U" and "V" components ensures that fetches of UV data that will be used simultaneously are generally local, single page fetches. In other words, because the "U" and "V" data is located adjacent to each other within the memory structure, fetches of the data that will be used together will be localized fetches and not fetches from various portions of the memory.

Figure 5:
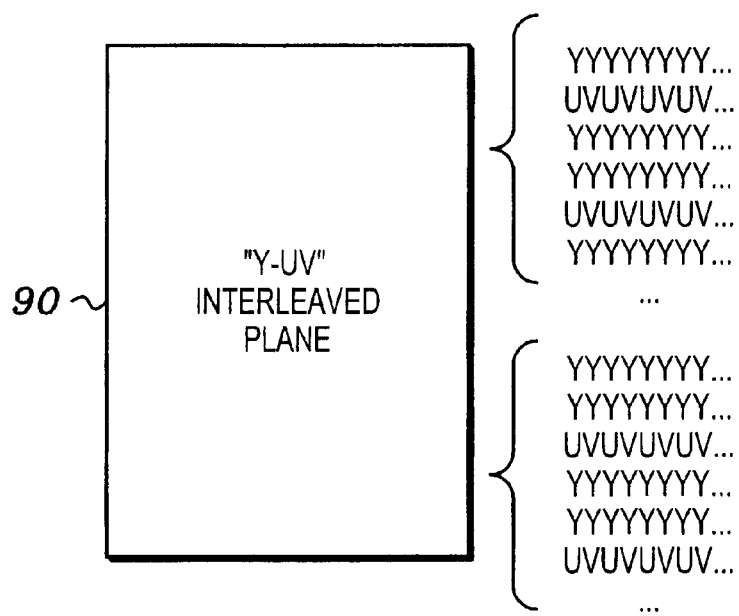
FIG. 5 illustrates a block of image data that has been fully interleaved in accordance with the present invention.

FIG. 5 illustrates a packed and interleaved plane 90. In the interleaved plane 90, the "Y" data from the "Y" plane 50 has been fully integrated and interleaved with the UV data from the "U" plane 60 and the "V" plane 70. In this case, interleaving includes the vertical interleaving of lines of "Y" data with packed lines of "UV" data. Because the "Y" and "UV" data must all be retrieved from the memory 10 in order to generate the display output 22 or to generate a new image based on data received in the video data stream 32, locating the "Y" and "UV" data together ensures that fetches from the memory 10 are efficient and effective.

As can be seen in FIG. 5, there are different ways of interleaving and combining the "Y" and "UV" data in the interleaved plane 90. In one example, four luminosity ("Y") samples are used in conjunction with a single color ("UV") pair. As is illustrated, a single row of "UV" components can be stored between a pair of "Y" rows such that when fetched, four "Y" components are easily combined with a single "UV" pair. Because the fetches typically occur in fairly sizable blocks, the specific ordering of the three rows, where one row is a "UV" row and the other two rows are "Y" rows, is unimportant. Thus, another example is illustrated where the "Y" rows are grouped together and the "UV" rows either precede or follow the "Y" rows.

It should be noted that in other video systems, the ratio of the number of "Y" components utilized with a single "UV" or multiple "UV" pairs may vary. It is important to understand that the specific ratio is unimportant as long as the groupings of the components within the memory reflect the usage of those components by the display output engine 20. Similarly, the number of color components may vary from one format to another. The interleaving and packing techniques described herein can be utilized in any system that includes at least two color components that are used together in the display and generation of images.

Similarly, the video data may be made up of color components other than a luminosity plane and the two color planes as has been illustrated thus far. For example, color components received as part of the video data stream 32 may include red, green, blue (RGB) color values; alpha values, where alpha indicates a level of translucence; Z values, where Z indicates a three-dimensional depth effect; and other potential color components. Basically, color components can include any component within the video data stream 32 that eventually influences the display of a particular pixel. By grouping these color components within the memory 10, block fetches from the memory 10 will retrieve a number of the color components that are used simultaneously to create the display output 22. These fetches are efficient and thus reduce the amount of bandwidth required to display the video image data.

In an example system, the input data stream 42 includes video image data and graphics data. The video image data received in the input data stream may be compressed MPEG image data. When the input data stream 42 is received by the parsing block 40, the parsing block 40 will separate the graphics data from the MPEG image data. If the MPEG image data is compressed, decompression will occur before the MPEG data is fed to the MPEG decoder 35 as video data stream 32.

The MPEG decoder 35 may also receive data within the video data stream 32 which is used together with video image data which has already been stored in the memory 10 to generate a new portion of video image data. This is common in MPEG type systems, where an initial image frame is received that contains the complete information required to generate the image. Successive image frames may then merely contain alterations to the original complete frame that, when combined with the original complete frame, produce a new image frame for a new portion of video image data. "P" and "B" MPEG frames are examples of such received data. These frames require that a previously stored "I" frame and possibly a previously stored "P" frame be fetched in order to generate the image. In such cases, the MPEG decoder 35 will fetch the data from the memory 10 via the interleaving/de-interleaving block 30, which will de-interleave the image data before passing it to the MPEG decoder. Once the MPEG decoder has generated the new image, it is passed to the interleaving/de-interleaving block 30, which interleaves the data and stores it in the memory 10.

Assuming that the MPEG image data is made up of luminosity and color components as has been illustrated in FIGS. 2–5, the "Y" and "UV" portions of the MPEG image data will be interleaved in order to store related luminosity and color values within local groupings. The local groupings are fetched via block fetches by the interleaving/de-interleaving block 30 and passed to either the display output engine 20 or the MPEG decoder 35. In the display output engine, the local groupings that are retrieved are used to generate the display output 22, whereas in the MPEG decoder, the local groupings are utilized to generate new images.

In the example, the ratio of the luminosity elements to elements of the first and second planes may be the 4:1 ratio as has been shown in FIGS. 2–5. Alternately, the ratio of luminosity elements used to generate the output in comparison to the number of color elements may be a 2:1 ratio, a 6:1 ratio or any other ratio that would be practical in such a system. The interleaving of such data having these ratios would be based upon how the data is used to generate the display output 22. If a number of components are used together to form the display output 22, these components are grouped locally within the memory 10 by the interleaving/de-interleaving block 30 such that fetches retrieve the data together.

In some systems, it may be beneficial to store graphics information in the memory 10 using similar interleaving/de-interleaving techniques. The color components that make up a graphics pixel and the alpha value that determines a level of translucence may be interleaved when stored in memory such that fetches of the graphics data by the display output engine 20 or other components in the system are more efficient. In such systems, the graphics engine 36 would store graphics data in the memory 10 via the interleaving/de-interleaving block 30 that would interleave the data before storage. Similarly, when graphics data was fetched from the memory 10, it would first be de-interleaved by the interleaving/de-interleaving block 30.

Figure 6:
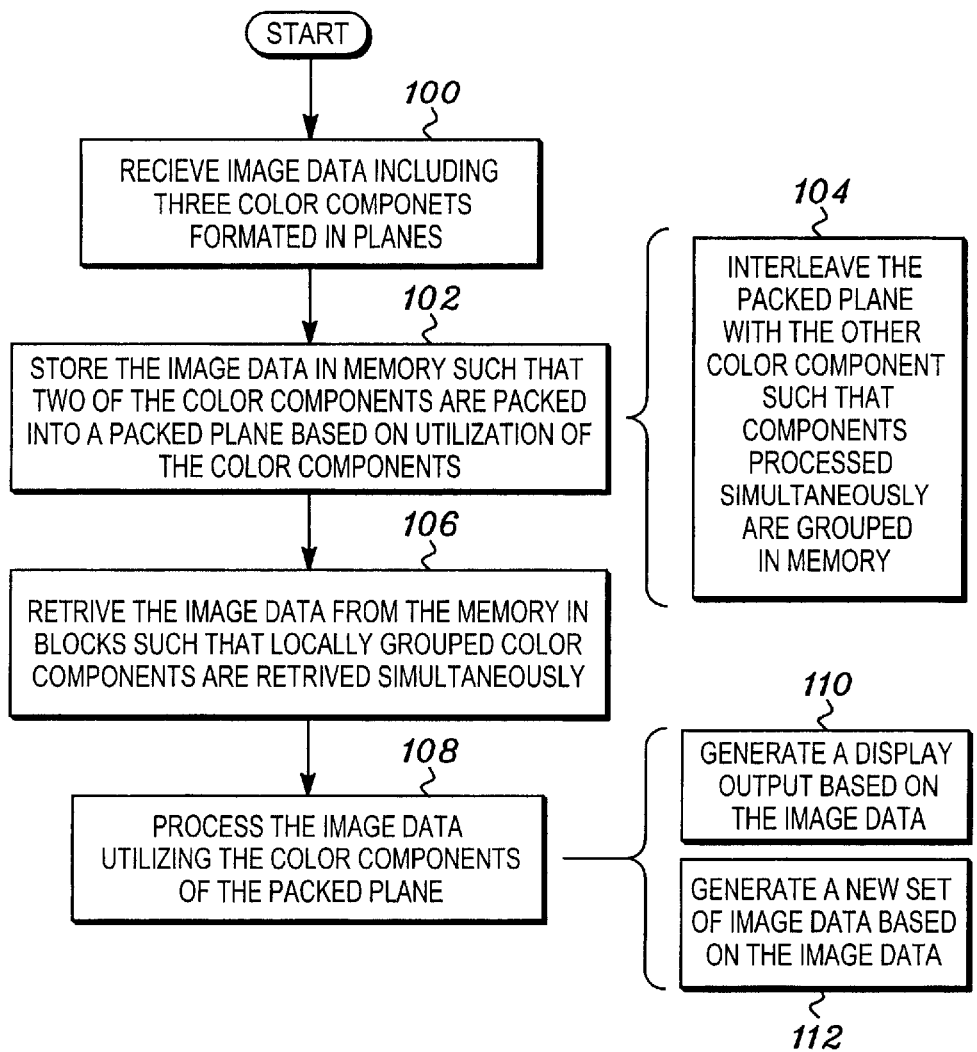
FIG. 6 illustrates a flow chart of a method of processing image data in a video graphics system in accordance with the present invention.

FIG. 6 illustrates a method for processing image data in a video graphics system. At step 100, image data is received. Preferably, the image data includes three color components, but any number of components greater than two can be interleaved to provide beneficial effects. Each of the color components is received in a planar format. The planar format within which color components are received may be the macroblock type structures illustrated in FIG. 2. If the components are received in separate planes, when they are stored in the memory, there is a higher probability that they will be stored on multiple pages.

At step 102, the image data is stored in memory such that at least two of the color components are packed into a packed plane. As stated earlier, packing includes horizontal interleaving of the components from each plane. The packed plane groups the packed color components locally, and which of the color components are packed may be determined based on how the color components are eventually utilized in the system. For example, in a video system which includes "Y", "U", and "V" data, the "U" plane and the "V" plane may be packed together as was illustrated in FIG. 3.

In addition to the packing of a portion of the received color components, the packed plane that has been generated may be interleaved with additional color components. As stated earlier, interleaving in this case includes vertical interleaving of the lines of one plane with that of another. At step 104, the packed plane is interleaved with other components that are going to be processed simultaneously such that all of these color components are grouped together in memory. Thus, in the example system in which "Y", "U" and "V" color components are received, the packed UV plane may be interleaved with the "Y" plane to form a fully interleaved and packed plane that is optimal for retrieving video data for display.

At step 106, the image data is retrieved from the memory in blocks such that locally grouped color components are retrieved together. In many systems, the block that retrieves the data from the memory will perform block fetches from the memory. These block fetches retrieve a large amount of data from a single page within the memory. As described earlier, if multiple pages are accessed in a fetch or are necessarily accessed to retrieve data that is used together to generate the display, timing penalties result. These penalties reduce the efficiency of the memory usage. Thus, placing portions of the video data that are used together in locally grouped portions of the memory allows them to be fetched together in a more efficient memory access.

For example, if a single fetch from the memory retrieves 16 bytes, the 16 bytes retrieved from an interleaved memory may include eight bytes from a first color plane along with four bytes from each of two other color planes that have been received. Referring to FIGS. 2–5, this might include retrieving eight bytes of "Y" data along with four bytes each of "U" and "V" data.

At step 108, the image data is processed utilizing the color components that have been fetched from the packed plane. If the image data has also been interleaved, the processing may include all of the required components for generating either an output display or a new image. At step 110, a display output is generated based on the image data. In other words, the data fetched from the memory is utilized to generate an image for a display screen. This may include combining the video image data with graphics data from another portion of the system. Alternately, the video image data may be combined with data from a number of other sources to produce the eventual display output.

At step 112, a new set of image data may be generated based on the image data that has been retrieved from the memory. This is similar to the example given above where in an MPEG system, an initial video image is received which is complete and subsequent images utilize portions of the complete image to generate new images. These new images can then be interleaved and stored in memory for retrieval and display.

As stated earlier, the three color components received at step 100 may include a luminosity component and two color values, where a plurality of a luminosity values are utilized with a single color value from each of the two color planes. In such a case, the "U" and "V" planes, or two color component planes which are used with the luminosity values, may be packed and interleaved and then interleaved further with the plane containing luminosity. This type of an interleaved system is best understood by referring to FIG. 5.

Figure 7:
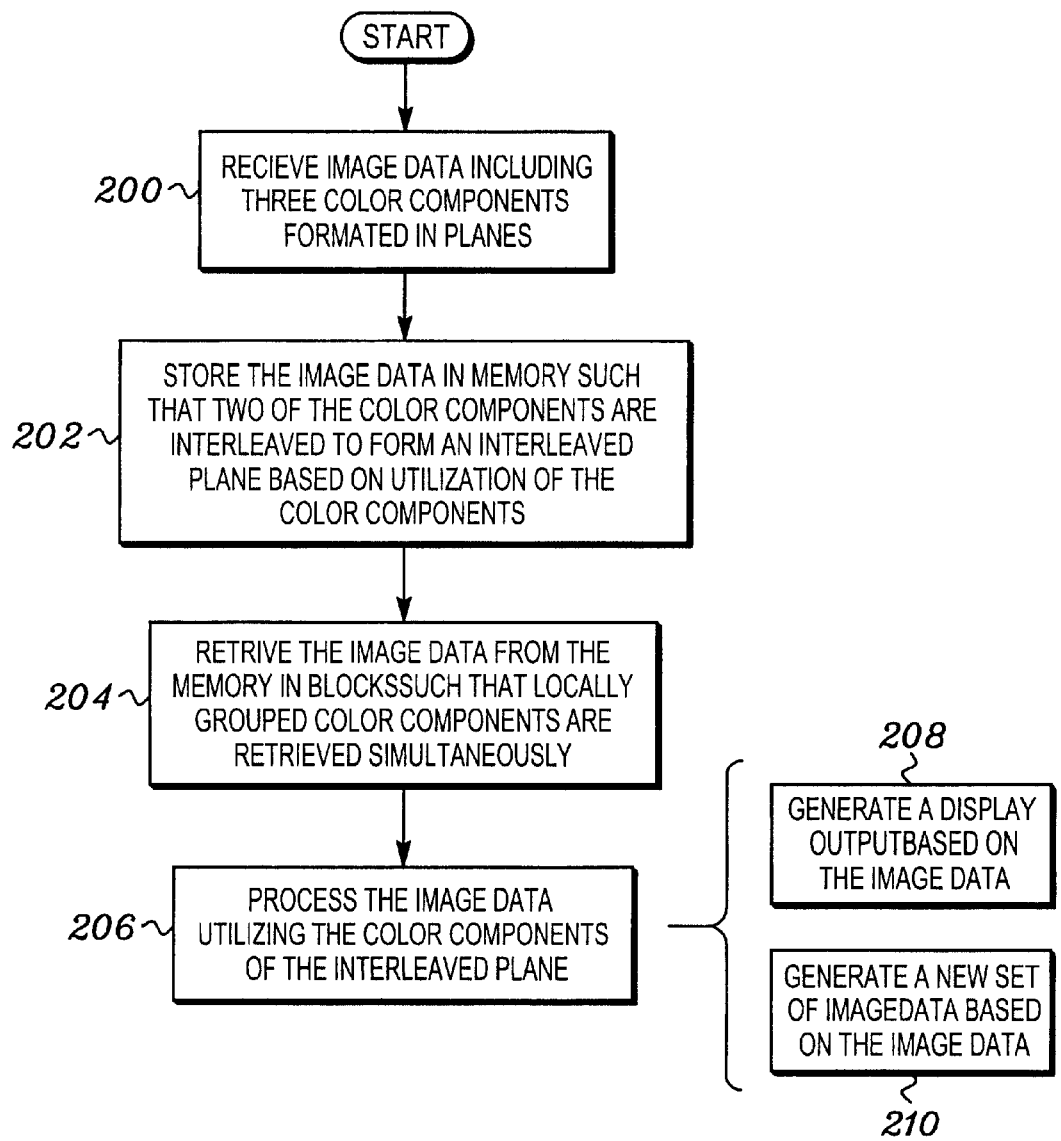
FIG. 7 illustrates an additional method for processing image data in a video graphics system in accordance with the present invention.

FIG. 7 illustrates an alternate method for processing image data in a video graphics system. At step 200, image data is received. This step is similar to step 100 of FIG. 6. At step 202, the image data is stored in memory such that two of the color components are interleaved to form an interleaved plane based on the utilization of the color components. Once again, interleaving in this situation includes vertical interleaving of lines from each of the planes. In a video graphics system that receives MPEG image data where the MPEG image data includes "Y", "U", and "V" color components, step 202 may include interleaving the "U" and "V" color components before storing these components in memory. By interleaving the "U" and "V" components, fetches from the memory will be more efficient as described earlier. Alternately, the interleaving described in step 202 might include interleaving one of the color components with a luminosity component, or interleaving all three of the components together.

At step 204, the image data is retrieved from the memory in blocks such that locally grouped color components are retrieved together. Step 204 is similar to step 106 of FIG. 6. At step 206 the image data is processed utilizing the color components of the interleaved plane. Thus, locally grouped color components in memory are retrieved together and processed together either to generate a display output at step 208 or generate a new set of image data at step 210. Because these color components have been interleaved and grouped locally, the fetches from the memory retrieve all of the image data required for processing. Thus multiple fetches from the memory or fetches that incur penalties due to retrieving data from multiple pages are avoided in many cases.

Figure 8:
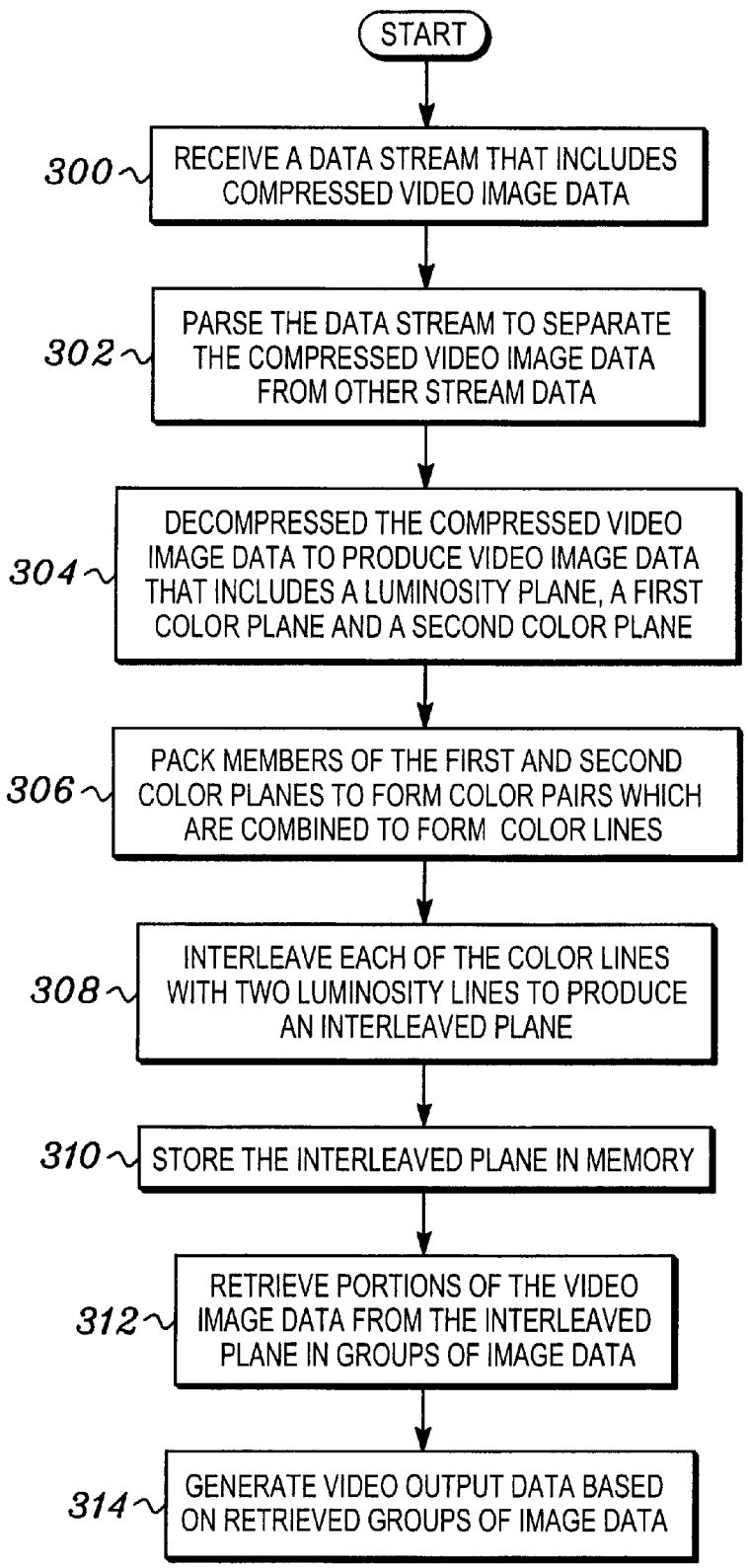
FIG. 8 illustrates a flow chart of a method for displaying video image data in accordance with the present invention.

FIG. 8 illustrates a method for displaying video image data. At step 300, a data stream is received that includes compressed video image data. Preferably, the data stream is the type of data stream that might be received by a set top box in a system that displays both video and graphics data on a display such as a television set. In such a preferred system, the data stream received includes compressed video image data which is preferably is compressed MPEG image data.

At step 302, the data stream is parsed to separate the compressed video image data from other stream data. In other words, graphics data, control data, or other portions of the data stream which do not include video image data are separated out and sent to other portions of the system or discarded.

At step 304, the compressed video image data is decompressed to produce a video image stream. The video image data of the video image stream includes a luminosity plane, a first color plane and a second color plane. As described earlier, a luminosity plane may be sampled at a higher rate than the two color planes. Similarly, the luminosity plane and two color planes may be received in the format as was illustrated in FIG. 2. At step 306, members of the first and second color planes are packed to form color pairs that are then combined to form color lines. The packing of the members of the first and second color planes may include horizontally interleaving the "U" and "V" components to form a packed plane as is illustrated in FIG. 4.

At step 308, each of the color lines is vertically interleaved with two luminosity lines in order to produce an interleaved plane. Thus, the "U" and "V" components are first packed or horizontally interleaved and then further interleaved with lines within the "Y" plane to form the interleaved plane. Note that all of the interleaving and packing steps may be performed in various orders, and the important factor is the resulting interleaved plane.

At step 310, the interleaved plane, which may resemble the interleaved plane illustrated in FIG. 5, is stored in memory, where the memory may be the frame buffer of a video graphics circuit used in a set-top box application. At step 312, portions of the video image data are retrieved from the memory. The retrieval of portions of video image data from memory typically occurs in a block transfer. The block transfer retrieves a number of data points within the interleaved plane together. Because the components of the video image data which are used together to either produce a new image or to produce a display output have been grouped locally within the interleaved plane, the block fetches will retrieve data that will be used together. By retrieving data that will be used together in a group fetch, the amount of bandwidth utilized to retrieve video image data for display or generation of a new video image is greatly reduced.

At step 314 a video output is generated based on the retrieved groups of image data. As stated earlier, the generation of a video output may include combining the video data with graphics data or other data streams before being output to the display device. Thus in a set-top box application, the video data may be combined with graphics images such as animated characters, spinning logos, menus, or descriptive text.

The method and apparatus described herein allows video image data to be stored and retrieved in an efficient manner such that memory bandwidth usage is minimized. This is becoming an increasingly important consideration in integrated multi-functional circuits that process video image data along with other groups of data that may also be stored within the memory structure. Because the demands of video image data in real-time digital video streams such as those resulting from a DVD player or digital television applications are so demanding, it is vital that the efficiency of memory, storage and retrieval circuits within such systems is maximized. This ensures that corruption of the video data stream or other data streams that are fed to the display is avoided. Failure to comply with the bandwidth limitations in a video graphics system can result in tearing or distortion of the image on the screen. This is unacceptable in applications such as set-top boxes that display video and graphics images simultaneously.

It should be understood that the implementation of other variations and modifications of the invention in its various aspects should be apparent to those of ordinary skill in the art, and that the invention is not limited to the specific embodiments described. For example, other data components that are not video data may be stored or interleaved in conjunction with the video data components assuming that these non-video components are utilized simultaneously with the video components in some form of processing. It is therefore contemplated to cover by the present invention, any and all modifications, variations, or equivalents that fall within the spirit and scope of the basic underlying principals disclosed and claimed herein.

What is claimed is:

1. A method for processing image data in a video graphics system comprising:
    receiving image data, wherein the image data includes at least three color components, wherein each of the color components is received in a plane;
    storing the image data in a memory, wherein storing includes packing a portion of the at least three color components into a packed plane such that color components of the packed plane are grouped locally, wherein the portion is determined based on utilization of the color components;
    retrieving the image data from the memory, wherein portions of the packed plane are retrieved such that locally grouped color components are retrieved simultaneously; and
    processing the image data, wherein processing utilizes the color components of the packed plane.

2. The method of claim 1, wherein processing the image data further comprises generating a display output based on the image data.

3. The method of claim 1, wherein processing the image data further comprises generating a new set of image data based on the image data.

4. The method of claim 1, wherein storing further comprises interleaving the packed plane with an additional one of the at least three color components such that components processed simultaneously are grouped in memory.

5. The method of claim 4, wherein receiving further comprises image data that includes three color components, wherein the three color components include luminosity, a first color value, and a second color value.

6. The method of claim 5, wherein a plane containing the luminosity is larger than planes for the first and second color values, wherein a plurality of luminosity values are utilized with a first color value and a second color value to produce output image data and wherein packing further comprises packing first and second color values to form the packed plane.

7. The method of claim 6, wherein interleaving further comprises interleaving the packed plane with the plane containing the luminosity.

8. The method of claim 7, wherein the receiving image data further comprises receiving MPEG image data.

9. A method for processing image data in a video graphics system comprising:
    receiving image data, wherein the image data includes at least three color components, wherein each of the color components is received in a plane;
    storing the image data in a memory, wherein storing further includes interleaving a portion of the at least three color components into an interleaved plane such that color components of the interleaved plane are grouped locally, wherein the portion is determined based on utilization of the color components;
    retrieving the image data from the memory, wherein portions of the interleaved plane are retrieved such that locally grouped color components are retrieved simultaneously; and
    processing the image data, wherein processing utilizes the color components of the interleaved plane.

10. The method of claim 9, wherein processing the image data further comprises generating a display output based on the image data.

11. The method of claim 9, wherein processing the image data further comprises generating a new set of image data based on the image data.

12. A method for displaying video image data comprising:
- receiving a data stream, wherein the data stream includes compressed video image data;
- parsing the data stream to separate the compressed video image data from other stream data;
- decompressing the compressed video image data to produce video image data, wherein video image data includes a luminosity plane, a first color plane and a second color plane, wherein the luminosity plane is larger than the first and second color planes;
- packing members of the first and second color planes to form color pairs, wherein a plurality of color pairs form a color line;
- interleaving each of the color lines with at least one luminosity line to produce an interleaved plane;
- storing the interleaved plane in a memory;
- retrieving portions of the video image data from the interleaved plane in groups of image data;
- generating video output data based on retrieved groups of image data, wherein luminosity and color values within the groups of image data are utilized together to produce the video output data.

13. The method of claim 12, wherein interleaving further comprises interleaving one color line with two luminosity lines.

14. A video image processing circuit comprising:
- a memory, wherein the memory stores video image data;
- an interleaving block operably coupled to the memory, wherein the interleaving block is adapted to receive a video data stream that includes image data, wherein the image data includes a luminosity plane, a first color plane, and a second color plane, wherein the interleaving block interleaves the first and second color planes with the luminosity plane to form an interleaved plane, wherein the interleaved plane is stored in the memory; and
- a display output engine operably coupled to the memory, wherein the display output engine retrieves interleaved portions of the interleaved plane from the memory and generates a display output based on the interleaved portions, wherein the interleaved portions include selected portions of the luminosity plane and the first and second color planes that are used together in generating the display output.

15. The video image processing circuit of claim 14 further comprises a parsing block operably coupled to the interleaving block, wherein the parsing block is adapted to receive an input data stream, wherein the parsing block parses the input data stream to separate the video data stream from other stream components.

16. The video image processing circuit of claim 15, wherein the input data stream includes graphics data.

17. The video image processing circuit of claim 16, wherein the video data stream includes MPEG image data.

18. The video image processing circuit of claim 14, wherein the interleaving block further includes circuitry such that the interleaving creates groupings within the interleaved plane, wherein a ratio of luminosity elements to elements of the first and second color planes within the groupings is four to one.

19. The video image processing circuit of claim 14, wherein the interleaving block reads a stored portion of the interleaved plane and combines the stored portion with information from the video data stream to create a new set of video image data, wherein the new set of image data and stored in the memory in an interleaved format.

20. A method for processing image data in a video graphics system comprising:
- receiving image data, wherein the image data includes at least two color components, wherein each of the color components is received in a plane;
- storing the image data in a memory, wherein storing includes interleaving a portion of the at least two color components into a packed plane such that color components of the packed plane are grouped locally, wherein the portion is determined based on utilization of the color components;
- retrieving the image data from the memory, wherein portions of the packed plane are retrieved such that locally grouped color components are retrieved simultaneously; and
- processing the image data, wherein processing utilizes the color components of the packed plane.

* * * * *